(12) United States Patent
Olkkonen et al.

(10) Patent No.: US 7,158,507 B1
(45) Date of Patent: Jan. 2, 2007

(54) CALL SETUP METHOD

(75) Inventors: Mikko Olkkonen, Inkoo (FI); Jarmo Harno, Espoo (FI)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 10/018,226

(22) PCT Filed: Jun. 21, 2000

(86) PCT No.: PCT/FI00/00555

§ 371 (c)(1),
(2), (4) Date: Apr. 19, 2002

(87) PCT Pub. No.: WO00/79743

PCT Pub. Date: Dec. 28, 2000

(30) Foreign Application Priority Data

Jun. 21, 1999 (FI) .................................. 991413

(51) Int. Cl.
 H04L 12/66 (2006.01)
(52) U.S. Cl. ................. 370/352; 370/401; 370/410; 370/338; 379/88.17
(58) Field of Classification Search ............ 370/352, 370/357, 389, 354, 338, 349, 401, 395.1, 370/395.03, 400, 402, 466, 522, 524, 373, 370/377, 384, 385, 353, 355, 356, 410, 465, 370/351; 455/445, 432, 435, 434, 455, 464, 455/550, 560, 453, 432.1, 435.1, 550.1, 414.1, 455/422.1, 417, 461, 436, 426.1, 412.1, 466, 455/433, 422, 426, 437, 438, 339, 440, 441
See application file for complete search history.

(56) References Cited

U.S. PATENT DOCUMENTS 5,751,706 A   5/1998  Land et al. ............. 370/352
5,828,666 A  10/1998  Focsaneanu et al. ........ 370/389
6,005,930 A * 12/1999  Baiyor et al. .......... 379/211.01
6,009,159 A * 12/1999  Baiyor et al. .......... 379/211.01

FOREIGN PATENT DOCUMENTS

| EP | 0 909 064 A2 | 4/1999 |
| EP | 909064 A2 * | 4/1999 |
| EP | 0964 553 | 12/1999 |
| WO | WO 97/16007 | 5/1997 |
| WO | WO 98/11704 | 3/1998 |
| WO | WO 98/48542 | 10/1998 |
| WO | WO 98/51117 | 11/1998 |
| WO | WO 99/04540 | 1/1999 |
| WO | WO 99/14929 | 3/1999 |
| WO | WO 9914929 A1 * | 3/1999 |
| WO | WO 99/20060 | 4/1999 |
| WO | WO 99/29123 | 6/1999 |

* cited by examiner

Primary Examiner—Ricky Q. Ngo
Assistant Examiner—Jamal A. Fox
(74) Attorney, Agent, or Firm—Cohen, Pontani, Lieberman & Pavane

(57) ABSTRACT

A network element of a telephone network and method for monitoring connections and receiving data from an incoming leg of a connection and forwarding the data to an outgoing leg of a connection, wherein when the network element observes that both the incoming and outgoing legs of a connection are transmitted via a packet data network to a previous or correspondingly the next element of the telephone network, a release of the previous network element occurs, and an indication of a packet network address corresponding to the next telephone network element is made. The previous network element may then transmit data via the packet data network directly to the next telephone network element.

18 Claims, 4 Drawing Sheets

CALL SETUP METHOD

PRIORITY CLAIM

This is a national stage of PCT application No. PCT/FI00/00555, filed on Jun. 21, 2000. Priority is claimed on that application, and on patent application No. 991413 filed in Finland on Jun. 21, 1999.

TECHNICAL FIELD OF THE INVENTION

The invention concerns transmission of calls in an environment, where both a fixed telephone network and a packet data network are used for transmission of a call. The invention is directed to a method according to the preamble of the first independent claim.

BACKGROUND OF THE INVENTION

In conventional telephony, a basic channel format is the 64 kbit/s channel, in which a single speech connection is transmitted. The 64 kbit/s channel transmits 8000 samples per seconds, each sample having 8 bits. Typically, a plurality of 64 kbit/s channels are transmitted in a single transmission line to form 1544 kbit/s, 2048 kbit/, and higher transmission rates. In a 2048 kbit/s transmission link, a 256 bit i.e. 32 byte frame is transmitted 8000 times per second. The 32 groups of 8 bits, i.e. bytes of the frame are referred to as time slots. The terms PCM transmission line and trunk line are commonly used to refer to a communication link transmitting a plurality of 64 kbit/s channels. Therefore, to identify a certain speech channel transmitted within a group of trunk lines, one needs to indicate the time slot number of the channel and a trunk line identifier. The term trunk line is sometimes used also to denote a basic 1544 kbit/s or 2048 kbit/s unit of transmission even in a case, when a plurality of such transmission units are transmitted in a single physical transmission medium i.e. in a single physical transmission line. Although the acronym PCM strictly considered denotes pulse code modulation, which is typically used in trunk lines, the term PCM transmission line is generally used by a person skilled in the art and specifically in this specification to refer to aforementioned logical group of channels or a group of groups of channels and not to a specific modulation method.

Further, packet based transmission networks are presently in widespread use, a prominent example being the Internet. A common packet transmission protocol is the Internet Protocol (IP). The IP protocol version 4 is described in detail in the specification RFC 791. The next version of the IP protocol, known as IPv6, is described in the specification RFC 1883.

The increasing importance and use of telecommunication drives toward inter-connection of different types of networks. For example, the Internet is already used for transmitting voice using so called internet telephony. As the data transmission capacity of the Internet increases, the use of Internet as a replacement of conventional telephones will become common. Some telephone operators already provide long distance calls via the Internet with a reduced rate.

Publication WO 9914929 discloses method and apparatus for placing long distance telephone calls via a packet data network and local telephone calls via local telephone network, the user of the telephone set plainly dialling the desired destination number. The routing of the call via either packet data network or telephone network is based on the destination number.

Publication WO 9904540 discloses a system for establishing communication between two endpoints connected to each other via two communication media, for example Ethernet and ATM (Asynchronous Transfer Mode), operating in accordance with different communication protocols. A connection controller selects a connection path connecting the two endpoints and configures the endpoints and an interface between the two communication media to establish a connection before any data is sent using the connection path.

Publication WO 9716007 discloses a telecommunication system, where it is possible to transmit calls between terminals using a packet switched network or a packet switched network and telephone network. There is a gateway connecting a packet switched network to telephone network. A first connection is typically set up between a first terminal and the gateway via, for example, the packet switched network and a second connection is set up between a second terminal and the gateway via the telephone network.

FIG. 1 illustrates one possible arrangement for transmission of speech using an IP network together with a telephone network. FIG. 1 shows switching elements 10a, 10b, 10c of the telephone network being connected to each other with PCM communication links 12. Further, FIG. 1 shows an IP network 40, and routers 30 connected to the IP network. Network elements such as IP gateways 20 connect the switching elements 10a, 10b, 10c to the routers 30. Without using the IP network, speech data from a first party PARTY A of a connection to a second party PARTY B is transferred using the PCM connections 12. The call may pass through a large number of switching elements, depending on the geographical distance spanned by the call. When the IP network 40, such as the Internet network is used, a switching element directs the speech data to an IP gateway instead of another switching element, and the IP gateway sends the speech data through the IP network to distant IP gateway connected to a distant switch element. The distant IP gateway converts the received IP packets to a speech data stream and forwards the data stream to the distant switch element for further processing. One or more legs of a call may be routed in such a way through an IP network.

One example of the proceeding of call setup according to prior art is illustrated in FIG. 2. FIG. 2 shows the local telephone exchange 5 of a calling party PARTY A and switching elements 10a, 10b, 10c of the telephone network. First, the calling party initiates the call, whereby the local telephone exchange sends 100 an ISUP SETUP message to the next switching element 10a. The switching element 10a performs digit analysis 105 to determine, where the call should be directed. In this example, the digit analysis reveals, that the next switching element SW B 10b is an IP capable switch. As a consequence, switching element SW A 10a sends an ISUP SETUP message 110 to switching element SW B 10b. The switching element SW A 10a may include in the message an indication that it wishes to set up an IP connection, for example as a parameter specifying an IP address corresponding to the IP gateway of switch element SW A. The switching element SW B 10b responds by sending 115 a message such as a CHANNEL INFO message specifying an IP address corresponding to the IP gateway connected to switch element SW B. After receiving the IP address, switching element SW A may start sending 120 speech data to switching element B via the IP gateways and the IP network. After sending the CHANNEL INFO message, the switching element SW B performs digit analysis 125 to determine, where it should direct the call. In this example, the digit analysis reveals that the next switching element is switching element SW C 10c, and that SW C is IP capable. As a consequence, switching element SW B 10b sends an ISUP SETUP message 130 to switching element SW C 10c. The switching element SW B 10b may include in the message an indication that it wishes to set up an IP connection, for example as a parameter specifying an IP address corresponding to the IP gateway of switch element SW B. The switching element SW C 10c responds by sending 135 a message such as a CHANNEL INFO message specifying an IP address corresponding to the IP gateway connected to switch element SW C. After receiving the IP address, switching element SW B may start sending 140 speech data to switching element C via the IP gateways and the IP network.

The resulting situation is not optimal regarding the efficiency of data transfer: switching element SW B receives a speech data stream from the IP network, and returns the speech data stream back to the network for forwarding to switching element SW C.

The same situation may occur also in a cellular telecommunication network, in which case the switching elements 10a, 10b, 10c are switching elements of a cellular telecommunications network, such as mobile services switching centers (MSC) of a GSM (Global System for Mobile communications) or a UMTS (Universal Mobile Telecommunication System) network. In a cellular telecommunication network such a situation may also occur as a result of a inter MSC handover, for example when a mobile station (MS) under control of MSC SW B moves to an area under control of MSC SW C, while having a connection to a mobile station under control of MSC SW A.

SUMMARY OF THE INVENTION

An object of the invention is to realize a method, which alleviates the problems associated with prior art. A further object of the invention is to realize such a method with minimal changes to existing protocols.

The objects are reached by arranging a switching element to monitor the connections, and initiate a connection release procedure, when it observes that both the incoming and outgoing leg of a connection are transmitted via a packet data network. The switching element also indicates to the originating switching element of the incoming leg the packet data address corresponding to the receiving switching element of the outgoing leg The method according to the invention is characterized by that, which is specified in the characterizing part of the independent method claim. The switching network element according to the invention is characterized by that, which is specified in the characterizing part of the independent claim directed to a switching network element. The dependent claims describe further advantageous embodiments of the invention.

The invention is applicable in situations, when a second network, i.e. a packet data network is used in combination with a circuit switched telephone network, such as a conventional telephone network or a cellular telephone network. According to the invention, a network element of the telephone network which receives data from an incoming leg of a connection and forwards the data to an outgoing leg of a connection monitors its connections, and when it observes that both the incoming and the outgoing legs of a connection are transmitted via a packet data network to the previous or correspondingly the next network element of the telephone network, it releases the connection to the previous network element of the telephone network and indicates a packet network address corresponding to the next telephone network element, after which the previous telephone network element may transmit data via the packet data network directly to the next telephone network element.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
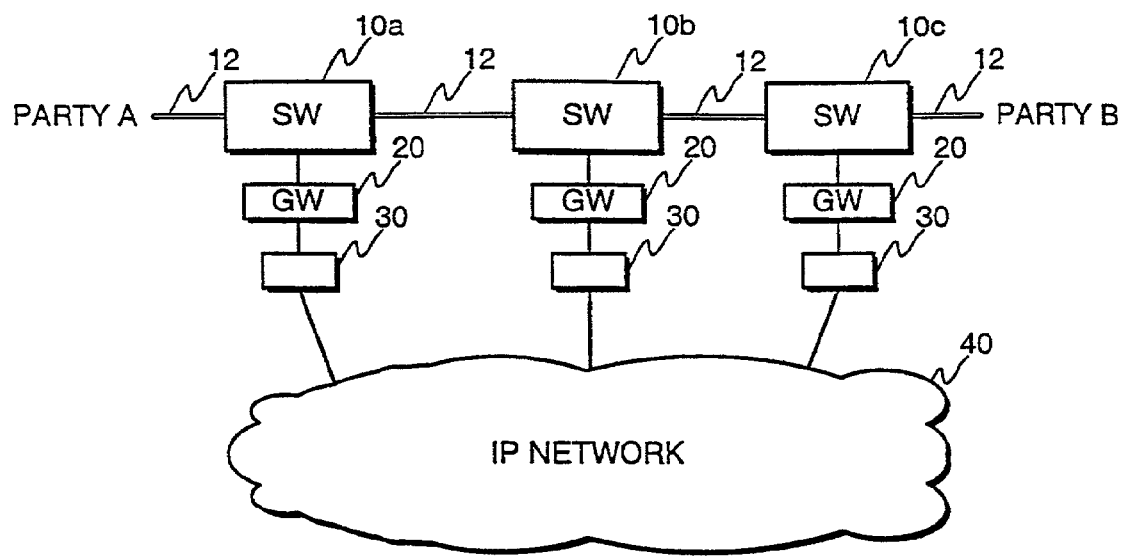
FIG. 1 illustrates transmission of data using both PCM transmission lines and a packet data network.
Figure 2:
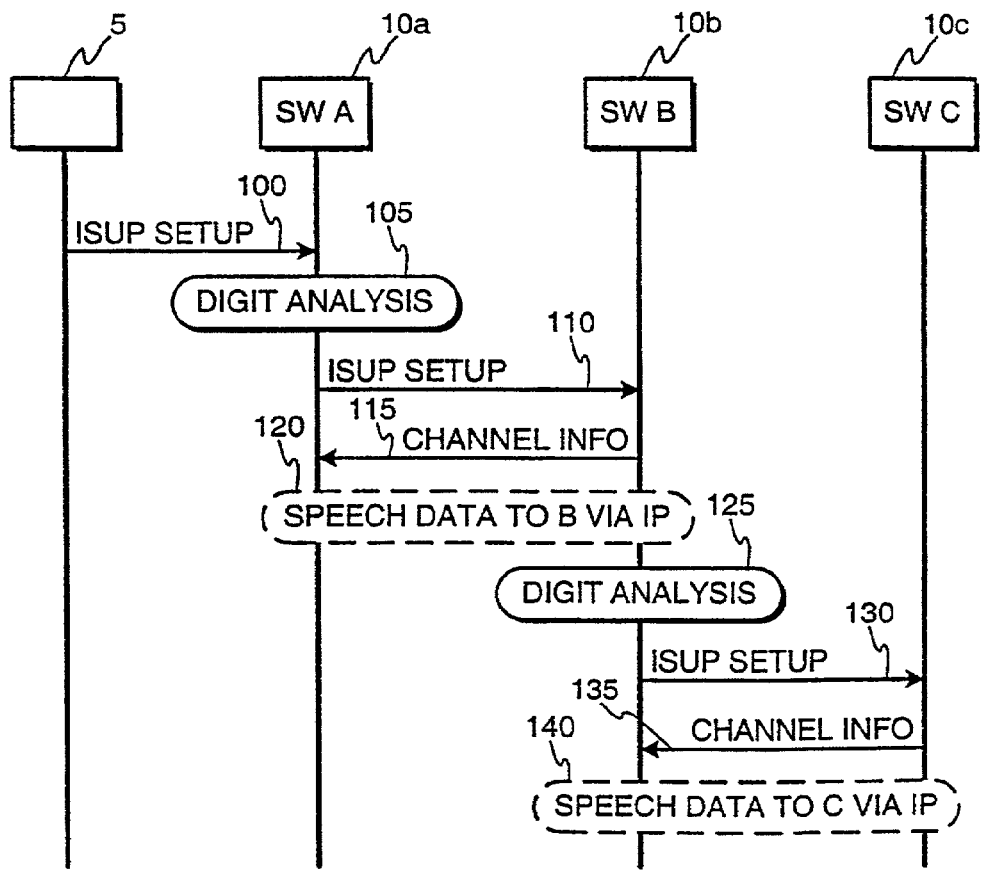
FIG. 2 illustrates a signalling sequence for setting up connections according to prior art.
Figure 3:
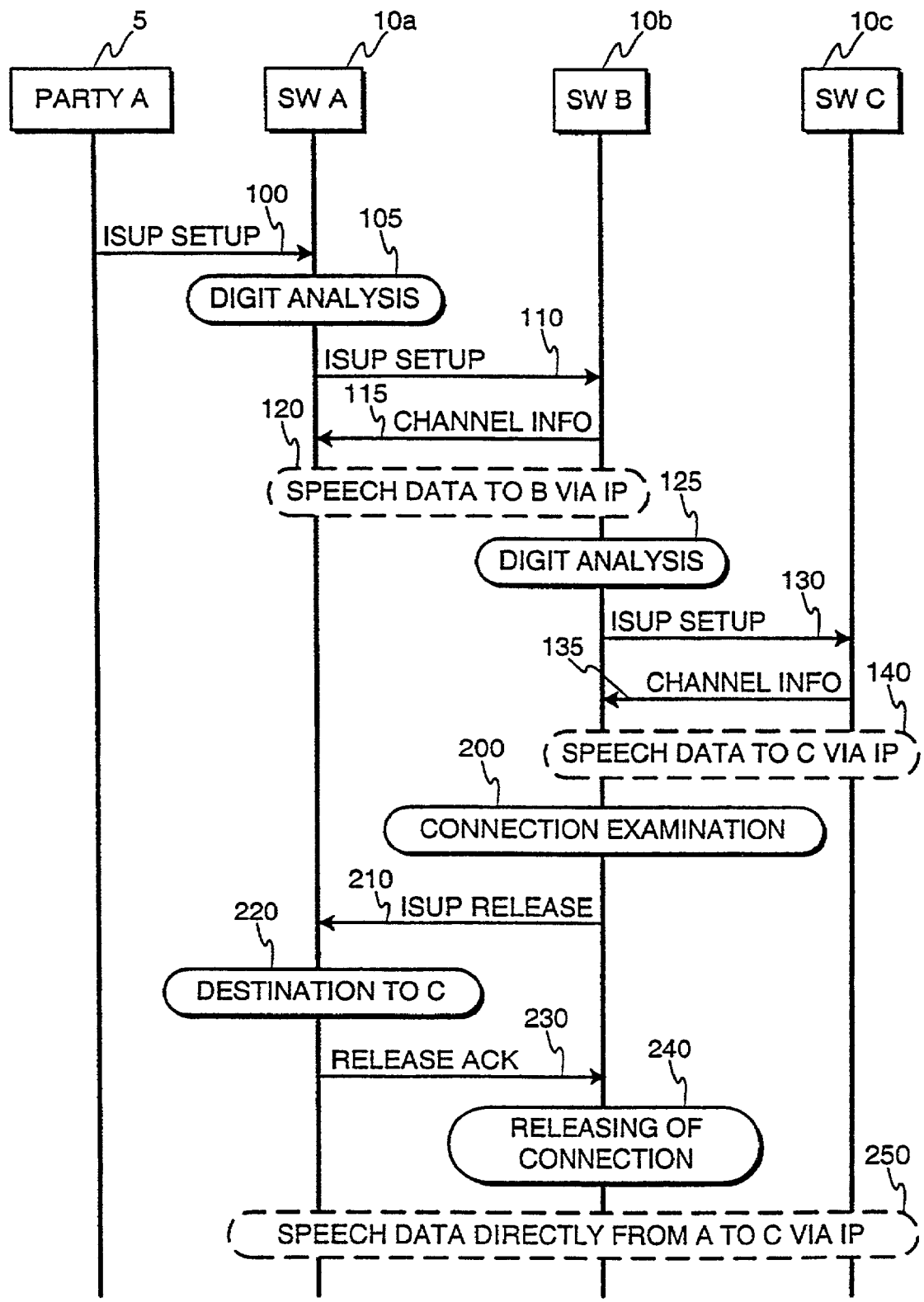
FIG. 3 illustrates a signalling sequence for setting up connections according to an advantageous embodiment of the invention.

FIG. 3 illustrates call setup signalling according to an advantageous embodiment of the invention.

FIG. 3 shows the local telephone exchange 5 of a calling party PARTY A and switching elements 10a, 10b, 10c of the telephone network. First, the calling party initiates the call, whereby the local telephone exchange sends 100 an ISUP SETUP message to the next switching element 10a. The switching element 10a performs digit analysis 105 to determine, where the call should be directed. In this example, the digit analysis reveals, that the next switching element SW B 10b is an IP capable switch. As a consequence, switching element SW A 10a sends an ISUP SETUP message 110 to switching element SW B 10b. The switching element SW A 10a may include in the message an indication that it wishes to set up an IP connection, for example as a parameter specifying an IP address corresponding to the IP gateway of switch element SW A. The switching element SW B 10b responds by sending 115 a message such as a CHANNEL INFO message specifying an IP address corresponding to the IP gateway connected to switch element SW B. After receiving the IP address, switching element SW A may start sending 120 speech data to switching element B via the IP gateways and the IP network. After sending the CHANNEL INFO message, the switching element SW B performs digit analysis 125 to determine, where it should direct the call. In this example, the digit analysis reveals that the next switching element is switching element SW C 10c, and that SW C is IP capable. As a consequence, switching element SW B 10b sends an ISUP SETUP message 130 to switching element SW C 10c. The switching element SW B 10b may include in the message an indication that it wishes to set up an IP connection, for example as a parameter specifying an IP address corresponding to the IP gateway of switch element SW B. The switching element SW C 10c responds by sending 135 a message such as a CHANNEL INFO message specifying an IP address corresponding to the IP gateway connected to switch element SW C. After receiving the IP address, switching element SW B may start sending 140 speech data to switching element C via the IP gateways and the IP network.

In the next step 200, switching element SW B examines, whether both legs SW A to SW B and SW B to SW C are transmitted via the IP network. In this example, both legs are transmitted via the packet network. As a consequence, the switching element SW B sends 210 an ISUP RELEASE message to switching element SW A, indicating an IP address corresponding to switching element SW C for example as a parameter attached to the ISUP RELEASE message. After receiving the ISUP RELEASE message, the switching element SW A changes 220 the destination address of the data stream sent to the IP network from an address corresponding to SW B to the address corresponding to SW C, and sends 230 a connection release acknowledgment message RELEASE ACK back to SW B. The switching element SW A may perform the changing of the destination address for example by signalling to the IP gateway connected to it that the new destination address of data packets of the call. After receiving the release acknowledgment message, switching element SW B releases the connection from its switch matrix. After sending the release acknowledgment message, SW A may start sending 250 data directly to C via the IP network.

The example of FIG. 3 shows that an ISUP RELEASE message can be used in an embodiment of the invention. However, the invention is not limited to use with the specifically named examples of various messages stated in this patent application. For example, also other call control release messages than the ISUP RELEASE message can be used in various embodiments of the invention.

In a further advantageous embodiment of the invention, the switching element SW B indicates an address corresponding to SW A to the switching element SW C, after which the switching element SW C may arrange the release of the route via SW A. Such an embodiment of the invention is advantageous, if the connection is a two-directional connection or has an associated connection in the other direction through the same route. In such a case it is not practically important, to which of switches SW A and SW C the indication of the address of the other switch is transmitted by SW B.

Figure 4:
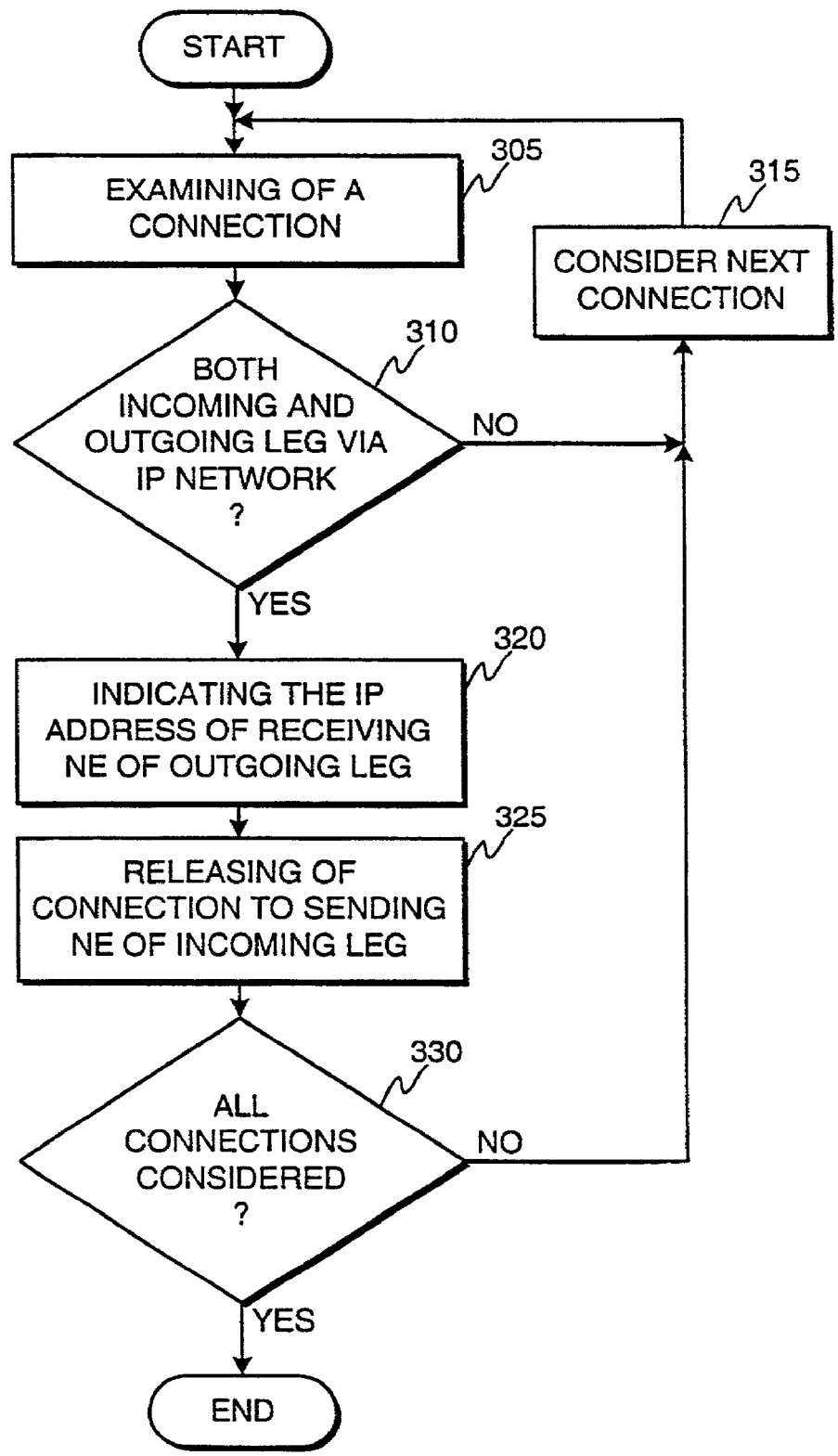
FIG. 4 shows a flow chart of an advantageous embodiment of the invention.

FIG. 4 shows a flow chart of a method according to an advantageous embodiment of the invention. The example of FIG. 4 illustrates an example of the functioning of switching network element SW B in FIG. 3.

In the first step 305, the switching network element examines a connection transmitted through the switching network element. More precisely, the switching network element examines 305, if both legs to either direction from the network element are transmitted via a packet data network such as an IP network. If both legs are not found to be transmitted via a packet network in step 310, the next connection is taken into consideration in step 315, whereafter the method continues at step 305. If both legs are transmitted via the same packet data network, the method is continued at step 320. The switching network element indicates a packet network address such as an IP address corresponding to the NE at the receiving end of the outgoing leg of the connection to the NE at the originating end of the incoming leg of the connection. Next, the switching network element releases 325 the connection from its switching matrix. If all connections are found to be already considered at step 330, the method is ended, otherwise the next connection is taken into consideration at step 315.

In a further advantageous embodiment of the invention, the step 230 of indicating the IP address also comprises sending a connection release message to the NE at the originating end of the incoming leg of the connection, and waiting for an acknowledgment message before proceeding to step 325. Preferably, the indication of the IP address is added as a parameter attached to a ISUP RELEASE message.

In a still further advantageous embodiment of the invention the network element i.e. network element SW B of FIG. 3 indicates to the NE at the receiving end of the outgoing leg of the connection, that data will be sent directly from the NE at the originating end of the incoming leg of the connection, i.e. from SW A of FIG. 3, to the NE at the receiving end of the connection, i.e. to SW C of FIG. 3.

Figure 5:
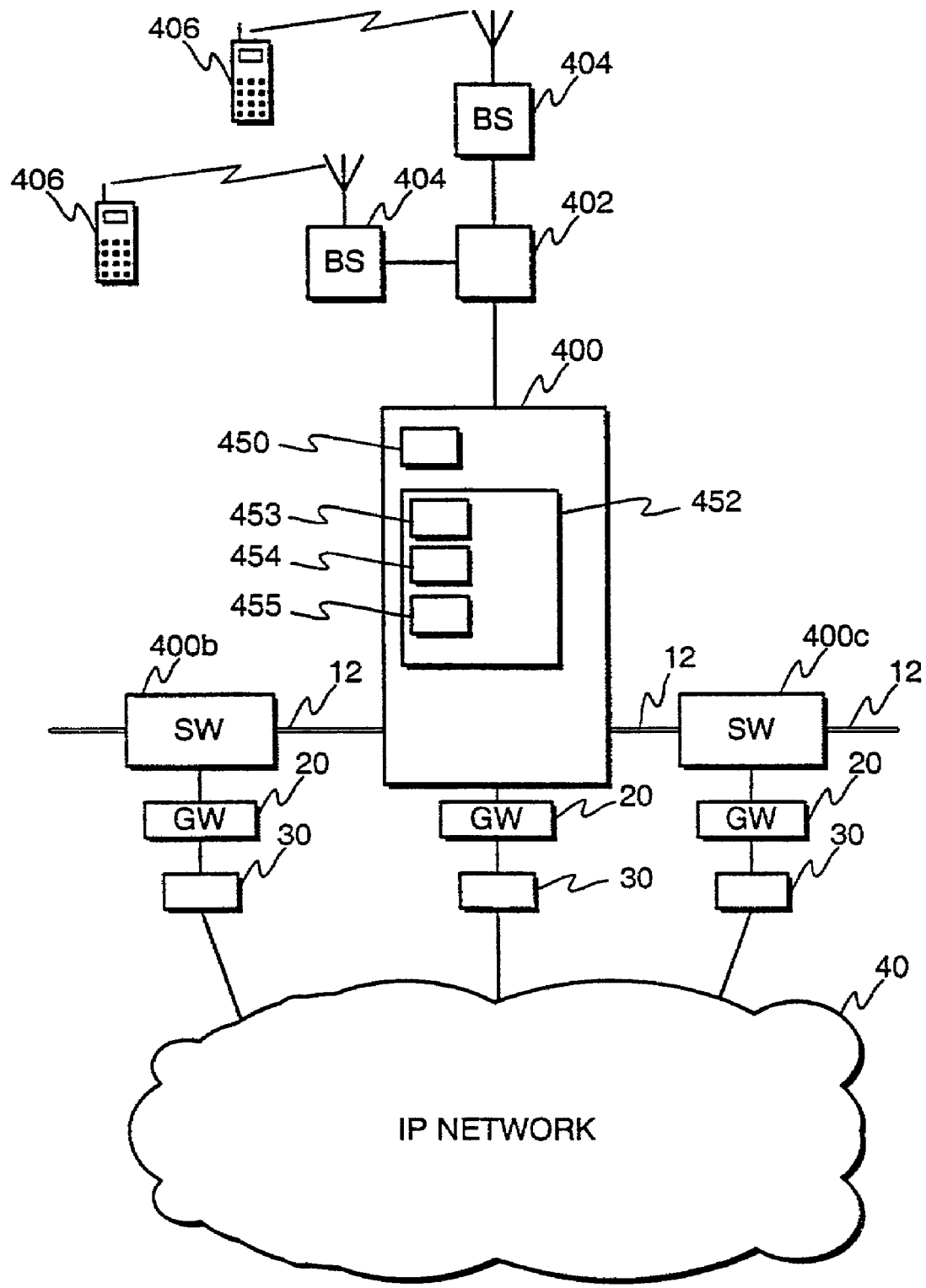
FIG. 5 illustrates an advantageous embodiment of the invention applied in a GSM system.

The invention can be used in many different cellular telecommunication systems, such as the GSM or the UMTS systems. For example, if the embodiment of FIG. 3 is applied in a GSM system, the switching network elements are MSC's (mobile services switching center) of the GSM system. FIG. 5 describes such an embodiment of the invention. FIG. 5 shows MSC's 400, 400b, and 400c, a base station controller (BSC) 402, base stations (BS) 404, and mobile communication means 406. FIG. 5 further shows packet network gateways 20 connected to the MSC's, and routers 30 connected to a packet data network 40 and the gateways 20. The MSC's 400, 400b, and 400c are connected by circuit switched data links 12 such as PCM links 12. In this exemplary embodiment of the invention, a switching network element 400, 400b, 400c comprises at least means 453 for examining the incoming and outcoming legs of connections and for producing an output if both said legs of a connection are transmitted via a packet data network instead of a circuit-switched connection, means 454 for indicating a packet data network address corresponding to one of the switching network element at the receiving end of said outgoing leg and the switching network element at the originating end of said incoming leg to the other of the switching network element at the receiving end of said outgoing leg and the switching network element at the originating end of said incoming leg as a response to said output, and means 455 for sending a connection release message as a response to said output to said one of the switching network element at the receiving end of said outgoing leg and the switching network element at the originating end of said incoming leg.

Advantageously said one of the switching network element at the receiving end of said outgoing leg and the switching network element at the originating end of said incoming leg is the switching network element at the receiving end of said outgoing leg; and said other of the switching network element at the receiving end of said outgoing leg and the switching network element at the originating end of said incoming leg is the switching network element at the originating end of said incoming leg.

FIG. 5 also shows a processing unit 450 and a memory unit 452 of a switching network element 400. The means 453, 454, and 455 are advantageously realized using software programs stored in the memory unit 452 and executed by a micro-processor of the control unit 450.

The invention can be used in fixed telephony networks as well in cases, in which a packet network is used for transmission of a connection for a part of the route. Generally, the switching elements of the invention are circuit switched type switching elements which can use packet connections for transmission of circuit switched data.

The previous examples describe the treatment of connections in general. However, in some systems it may be advantageous to separate control of a connection and the transfer of the actual data from each other. In such a case, two connections are actually formed for transferring a single stream of data: a control connection and user data connection. The control connection is created by the data transfer system for controlling the data flow in the user data connection, which transfers the actual payload data. The control connection is consequently a very low-volume connection, since it transfers only control signalling. In an advantageous embodiment of the invention, only the user data connection is led through a packet data network as described previously, and the control connection is retained within the circuit switched network. For example, if such an embodiment is realized using signalling according to FIG. 3, only the user data connection is controlled and directed according to FIG. 3, but the control connection continues to go via switching network elements SW A, SW B, and SW C. Such an arrangement may be advantageous in terms of ease of control of connections, and allows all control functions of the circuit switched network such as billing to be used despite the use of a packet data network as a part of the data transfer route.

The term user data connection in the attached patent claims therefore covers the user data connection in such systems, in which user data connections and control connections are separate. Further, the term user data connection covers the transmitted connection in systems, in which there is no separation between the payload and control aspects of a connection. Further, the user data connection can transfer speech data, images, video data, fax data, or any other type of data transferred in a circuit switched connection.

In this specification and in the attached patent claims, the term leg of a connection refers to a part of a connection from one switching element of a telephone network to another.

The IP addresses used in various embodiments of the invention may be IPv4 addresses described in detail in the specification RFC 791, or IPv6 addresses described in the specification RFC 1883. The invention can be used with both IP version 4 and IP version 6 networks, as well as other packet data networks.

The name of a given functional entity, such as the base station controller, is often different in the context of different cellular telecommunication systems. For example, in the UMTS (Universal Mobile Telecommunication System) system the functional entity corresponding to a base station controller (BSC) is the radio network controller (RNC). Therefore, the particular terminology used to denote various functional entities in this specification are only examples according to the GSM system, and do not limit the invention in any way. Further, the various command and message names such as the CHANNEL INFO message name are intended to be examples only, and the invention is not limited to using the command and message names recited in this specification.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention as defined in the appended claims.

The invention claimed is:

1. A method for optimizing data transmission in a telephone network, the method comprising the steps of:
    examining at a first switching network element whether an incoming leg of a user data connection is transmitted from a second switching network element via a packet data network and if whether an outgoing leg of the same user data connection is transmitted to a third switching network element via said packet data network;
    indicating an address of said packet data network corresponding to the other of said second and third switching network elements from said first switching network element to one of said second and third switching network elements if both the incoming and the outgoing legs are transmitted via said packet data network; and
    releasing the user data connection between said first switching network element and one of said second and third switching network elements via said first switching network element.

2. The method of claim 1, wherein one of said second and third switching network elements comprises said second switching network element and the other of said second and third switching network elements comprises said third switching network element.

3. The method of claim 1, wherein said packet data network comprises an internet protocol (IP) network and said address of said packet data network comprises an IP address.

4. The method of claim 3, wherein said address of said packet data network comprises an IPv4 address in accordance with RFC 791.

5. The method of claim 3, wherein said address of said packet data network comprises an IPv6 address in accordance with RFC 1883.

6. The method of claim 1, wherein said address corresponding to one of said second and third switching network elements is indicated to the other of said second and third switching network elements using a call control release message.

7. The method of claim 6, wherein said indication is attached to an Integrated Services Digital Network (ISDN) User Part (ISUP) RELEASE message.

8. The method of claim 1, wherein said connection comprises a speech data connection.

9. The method of claim 1, wherein said switching network element comprises a network element of a cellular telecommunications network.

10. The method of claim 1, wherein said switching network element comprises a mobile services switching center (MSC) of a cellular telecommunications network.

11. The method of claim 10, wherein said switching network element comprises a MSC of a Global System for Mobile Communications (GSM) network.

12. The method of claim 10, wherein said switching network element comprises a MSC of a Universal Mobile Telecommunications System (UMTS) network.

13. A switching network element of a telephone network, the network element comprising:
    means for examining incoming and outgoing legs of connections and for producing an output if both legs of the connection are transmitted via a packet data network instead of a circuit-switched connection;
    means for indicating a packet data network address corresponding to one of the switching network element at a receiving end of said outgoing leg and the switching network element at an originating end of said incoming leg to another switching network element at the receiving end of said outgoing leg and the switching network element at the originating end of said incoming leg as a response to said output; and
    means for sending a connection release message as the response to said output to one of the switching network elements at the receiving end of said outgoing leg and the switching network element at the originating end of said incoming leg;

means for releasing the user data connection between the switching network element at the originating end of said incoming leg and one of the switching network elements at the receiving end of said outgoing leg.

14. The switching network element of claim 13, wherein one of the switching network element at the receiving end of said outgoing leg and the switching network element at the originating end of said incoming leg comprises the switching network element at the receiving end of said outgoing leg; and the other of the switching network element at the receiving end of said outgoing leg and the switching network element at the originating end of said incoming leg comprises the switching network element at the originating end of said incoming leg.

15. The switching network element of claim 13, wherein the switching network element comprises a network element of a cellular telecommunications network.

16. The switching network element of claim 13, wherein the switching network element comprises a mobile services switching center (MSC) of a cellular telephone network.

17. The switching network element of claim 13, wherein the switching network element comprises a mobile services switching center (MSC) of a Global System for Mobile Communications (GSM) network.

18. The switching network element of claim 13, wherein the switching network element comprises a mobile services switching center (MSC) of a Universal Mobile Telecommunications System (UMTS) network.

* * * * *